United States Patent Office 3,551,426
Patented Dec. 29, 1970

3,551,426
3-PHENYL AND SUBSTITUTED PHENYL IMIDAZO AND PYRIMIDO THIAZOLES
Robert E. Manning, Mountain Lakes, N.J., assignor to Sandoz-Wander, Inc., Hanover, N.J., a corporation of Delaware
No Drawing. Filed Dec. 16, 1968, Ser. No. 791,847
Int. Cl. C07d 91/52
U.S. Cl. 260—251
9 Claims

ABSTRACT OF THE DISCLOSURE 3-phenyl and substituted phenyl-imadazo and pyrimido thiazoles, e.g., 2-chloro-3-(p-chlorophenyl)-5,6-dihydroimidazo[2,1-b]thiazole and 2-chloro-3-phenyl-6,7-dihydro-5H-thiazolo[3,2-a]pyrimidine, are prepared by reacting α-choloro-α-haloactetophenones with appropriate cyclic alkylene thiones, and are useful as anti-depressants.

---

This invention relates to novel heterocyclic compounds. More specifically it relates to novel 3-phenyl and 3,4-substituted-3-phenyl-5,6-dihydroimidazo and 6,7-dihydropyrimido thiazoles, intermediates therefor, acid addition salts thereof and processes for their preparation.

The thiazoles of the present invention may be represented by the formula

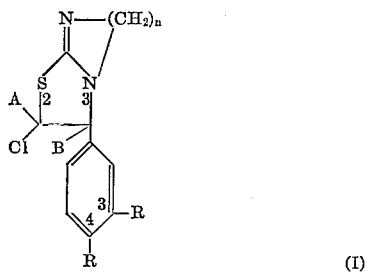

where
each R independently represents H or halogen having an atomic weight of 19 to 36,
A is H, B is OH or A and B together represent a carbon to carbon bond, and
n is 2 or 3.

The process for preparing compounds of Formula I in acid addition salt form where A and B represent a carbon to carbon bond may be represented as follows:

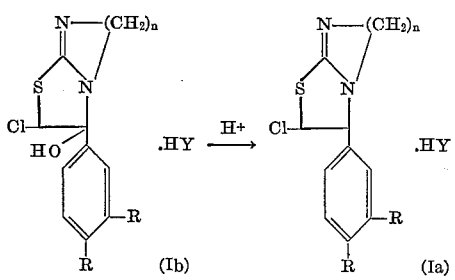

where R and n have the above-stated significance, and Y is a strong mineral acid anion.

The thiazoles of Formula Ia are prepared from the compounds of Formula Ib by treatment with acid such as hydrochloric, hydrobromic acid and acetic acid (preferably acetic acid). The compounds of Ia may be prepared from the free base form of Ib by treating Ib with a strong mineral acid. The reactions may be performed at a temperature from room temperature to about reflux temperature, in a solvent. The use of solvent and the particular solvent utilized is not considered critical. Solvents which may be used are lower alkanols such as ethanol, isopropanol and the like, acetone, tetrahydrofuran, and similar inert solvents.

The compounds of Formula I are prepared from the compounds of Formula Ia and Ib in acid addition salt form by conventional methods such as suspending the salt form Ia or Ib in water and adding sodium carbonate.

Compounds of Formula Ib where Y is Cl or Br Ic may be prepared in accordance with the following reaction scheme:

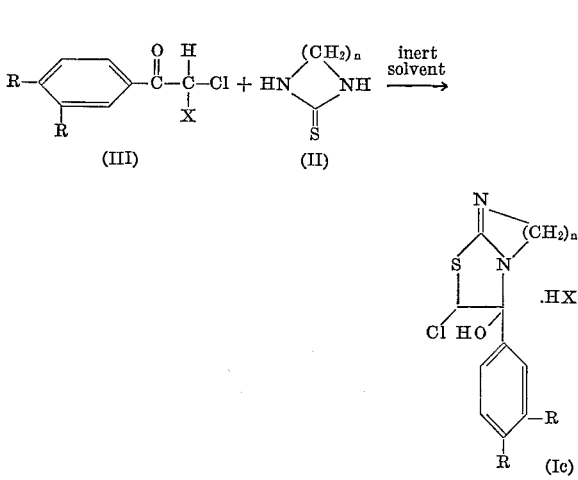

where R and n have the above-stated significance and X is Br or Cl.

The compounds of Formula Ic are prepared by treating an α-chloro-αhaloacetophenone (III) with a cyclicalkylene thione of formula (II), e.g., 3,4,5,6-tetrahydropyrimidine-2-thione in an inert solvent such as acetone or lower alkanols having 1 to 5 carbon atoms at a temperature of from room temperature to reflux temperature. Neither reaction time nor temperature are critical.

The remaining compounds of Ib may be prepared from compounds Ic by preparing the free base form of Ic by conventional methods such as suspending the salt form Ic in water and adding sodium carbonate, and then treating the free base form Ic with strong mineral acid.

The compounds of Formula Ib above can be recovered as their acid addition salts. When it is desired to convert such salts to the corresponding free bases, conventional techniques may be utilized, e.g., dissolution of the salt in water and precipitation using a base such as sodium carbonate.

Certain of the cyclicalkylene thioureas (II) and α-chloro-α-halobutyrophenones (III), above, are know and are prepared by methods disclosed in the literature. Those not specifically disclosed are prepared from known materials in an analogous manner.

The compounds of Formula I are useful because they possess pharmacological activity in animals. More particularly, the compounds posses CNS stimulant activity and are useful an antidepressants as indicated by their activity in the mouse given parenterally 2.5–20 mg./kg. of body weight of active material. The test method used is basically as described by Spencer, P.S.J., Antagonism of Hypothemia in the Mouse by Antidepressants, in Antidepressant Drugs, p. 194–204, Eds. S. Garattini and M.N.G. Dukes, Excerpta Medica Foundation, 1967.

The compounds of Formula I may be combined with a pharmaceutically acceptable carrier or adjuvant. They may be administered orally or parenterally. The dosage will vary depending upon the mode of administration utilized and the particular compound employed.

The compounds of Formula I may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzenesulfonate and the like.

In general, satisfactory results for antidepressant activity are obtained when the compounds are administered at a daily dosage of from about 5 to 25 milligrams per kilogram of animal body weight. This daily dosage is preferably given in divided doses, e.g., 2 to 4 times a day, or in sustained release form. For most large animals, the total daily dosage is from about 1.5 to 75 milligrams and dosage forms suitable for internal administration comprise from about 5 to about 35 milligrams of the compound in admixture with a solid or liquid pharmaceutical carrier or diluent.

A representative formulation suitable for oral administration is a tablet prepared by standard tabletting techniques which contains the following:

| Ingredient: | Parts by weight |
|---|---|
| 2-chloro-3-phenyl-6,7-dihydro-5H-thiazole[3,2-a] pyrimidine hydrochloride | 10 |
| Tragacanth | 2 |
| Lactose | 79.5 |
| Corn starch | 5 |
| Talcum | 3 |
| Magnesium stearate | 0.5 |

This invention is illustrated but not limited by the following examples.

EXAMPLE 1

2-chloro-3-phenyl-6,7-dihydro-5H-thiazole[3,2-a]pyrimidine hydrochloride

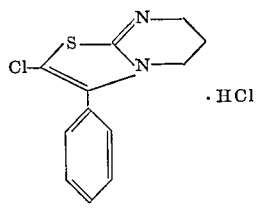

Step 1.—2-chloro-3-hydroxy-3-phenyl-2,3,6,7-tetrahydro-5H-thiazolo-[3,2-a]pyrimidine hydrochloride A mixture of α,α-dichloroacetophenone (23.6 g.), 3,4,5,6-tetrahydropyrimidine-2-thione (14.5 g.) and acetone (500 ml.) was refluxed for 72 hours. The resultant solid was collected by filtration and crystallized from methanol-ethylacetate to give 17.0 g. of 2-chloro-3-hydroxy - 3 - phenyl - 2,3,6,7-tetrahydro-5H-thiazolo[3,2-a]pyrimidine hydrochloride, M.P. 181°–182° dec.

Step 2.—2-chloro-3-phenyl-6,7-dihydro-5H-thiazolo[3,2-a]pyrimidine hydrochloride A mixture of 2-chloro-3-hydroxy-3-phenyl-2,3,6,7-tetrahydro-5H-thiazolo[3,2-a]pyrimidine hydrochloride (3.0 g.) and acetic acid (20 ml.) was refluxed 40 hours. The resultant mixture was evaporated in vacuo to give a residue which was crystallized from acetone. The resultant solid was then recrystallized from ethanol-ether (1:2) to give 1.4 g. of 2-chloro-3-phenyl-6,7-dihydro-5H-thiazolo[3,2-a]pyrimidine hydrochloride, M.P. 271°–272° dec.

EXAMPLE 2

2-chloro-3-(p-chlorophenyl)-6,7-dihydro-5H-thiazolo[3,2-a]pyrimidine hydrochloride

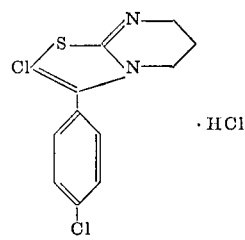

Step 1.—2-chloro-3-(p-chlorophenyl)-3-hydroxy-2,3,6,7-tetrahydro-5H-thiazolo[3,2-a]pyrimidine hydrochloride A mixture of α,α-p-trichloroacetophenone (22.3 g.), 3,4,5,6-tetrahydropyrimidine-2-thione (11.6 g.) and acetone (500 ml.) was refluxed for 72 hours. The resultant solid was crystallized from methanol-ether (1:3) to give 30.0 g. of 2-chloro-3-(p-chlorophenyl)-3-hydroxy-2,3,6,7-tetrahydro - 5H - thiazolo[3,2-a]pyrimidine hydrochloride, M.P. 273°–274° dec.

Step 2.—2-chloro-3-(p-chlorophenyl)-6,7-dihydro-5H-thiazolo[3,2-a]pyrimidine hydrochloride A mixture of 2-chloro-3-(p-chlorophenyl)-3-hydroxy-2,3,6,7 - dihydro-5H-thiazolo[3,2-a]pyrimidine hydrochloride (5.0 g.) and acetic acid (25 ml.) was refluxed for 52 hours. The resultant mixture was evaporated in vacuo and the residue crystallized from acetone to give 2.3 g. of 2 - chloro-3-(p-chlorophenyl)-6,7-dihydro-5H-thiazolo[3,2-a]pyrimidine hydrochloride, M.P. 290°-292° C. dec.

EXAMPLE 3

2-chloro-3-(p-chlorophneyl)-5,6-dihydroimidazo[2,1-b]thiozole hydrochloride

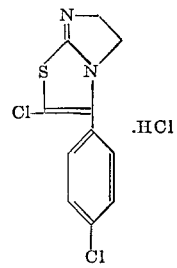

Step 1.—2-chloro-3-(p-chlorophenyl)-3-hydroxy-2,3,5,6-tetrahydroimidazo[2,1-b]thiozole hydrochloride A mixture of α,α-p-trichloroacetophenone (22.3 g.), 2-imidazoline-2-thione (11.3 g.) and acetone (500 ml.) was refluxed 72 hours. The resultant solid was collected by filtration and crystallized from methanol-ether (1:3) to give 2-chloro-3-(p-chlorophenyl)-3-hydroxy-2,3,5,6-tetrahydroimidazo[2,1-b]thiozole hydrochloride.

Step 2.—2-chloro-3-(p-chlorophenyl)-5,6-dihydroimidazo[2,1-b]thiozole hydrochloride A mixture of 2-chloro-3-(p-chlorophenyl)-3-hydroxy-2,3,5,6 - tetrahydroimidazo[2,1 - b]thiozole hydrochloride (5.0 g.) and acetic acid (25 ml.) was refluxed for 52 hours. The resultant mixture was evaporated in vacuo and the residue crystallized from acetone to give 2-chloro-3 - (p - chlorophenyl)-5,6-dihydroimidazo[2,1-b]thiozole hydrochloride.

What is claimed is:
1. A compound of the formula

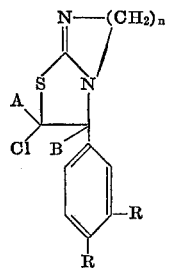

wherein each

R independently represents H or halogen having an atomic weight of 19 to 36,
A is H, and
B is OH, or
A and B together represent a carbon to carbon bond,
n is 2 or 3, or
a pharmaceutically acceptable acid addition salt thereof.

2. A compound according to claim 1 of the formula

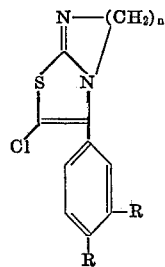

wherein each

R independently represents H, or halogen having an atomic weight of 19 to 36,
n is 2 or 3, or
a pharmaceutically acceptable acid addition salt thereof.

3. A compound according to claim 1 of the formula

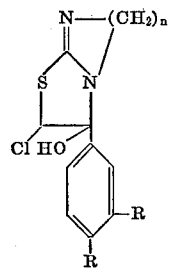

wherein each

R independently represents H, or halogen having an atomic weight of 19 to 36,
n is 2 or 3, or
a pharmaceutically acceptable acid addition salt thereof.

4. The compound of claim 2 which is 2-chloro-3-(p-chlorophenyl)-5,6-dihydroimidazo[2,1-p]thiazole.
5. The compound of claim 2 which is 2-chloro-3-phenyl)-6,7-dihydro-5H-thiazolo[ ),2-a]pyrimidine.
6. The compound of claim 2 which is 2-chloro-3-(p-chlorophenyl)-6,7 - dihydro-5H - thiazolo[3,2-a]pyrimidine.
7. The compound of claim 3 which is 2-chloro-3-(p-chlorophenyl)-3-hydroxy - 2,3,5,6 - tetrahydroimidazo[2,1-b]thiazole.
8. The compound of claim 3 which is 2-chloro-3-hydroxy-3-phenyl-2,3,6,7 - tetrahydro - 5H-thiazolo[3,2-a]pyrimidine.
9. The compound of claim 3 in which 2-chloro-3-(p-chlorophenyl)-3-hydroxy - 2,3,6,7-tetrahydro-5H-thiazolo[3,2-a]pyrimidine.

References Cited

UNITED STATES PATENTS 3,169,970  2/1965  Synder _____ 260—247.1

NICHOLAS S. RIZZO, Primary Examiner

R. V. RUSH, Assistant Examiner

U.S. Cl. X.R.

260—306.7, 592; 424—251, 270